United States Patent
Downing

(10) Patent No.: US 9,844,968 B2
(45) Date of Patent: Dec. 19, 2017

(54) SYSTEMS AND METHODS FOR CREATING OPTICAL EFFECTS ON MEDIA

(71) Applicant: 3DTL, Inc., Santa Clara, CA (US)

(72) Inventor: Elizabeth A. Downing, Santa Clara, CA (US)

(73) Assignee: 3DTL, Inc., Los Altos Hills, CA (US)

( * ) Notice: Subject to any disclaimer, the term of this patent is extended or adjusted under 35 U.S.C. 154(b) by 556 days.

(21) Appl. No.: 14/304,437

(22) Filed: Jun. 13, 2014

(65) Prior Publication Data

US 2015/0014981 A1  Jan. 15, 2015

Related U.S. Application Data

(60) Continuation of application No. 13/327,744, filed on Dec. 15, 2011, now Pat. No. 8,840,983, which is a (Continued)

(51) Int. Cl.
    B42D 25/30     (2014.01)
    C09B 67/08     (2006.01)
    (Continued)

(52) U.S. Cl.
    CPC ............ *B42D 25/30* (2014.10); *B42D 25/29* (2014.10); *B42D 25/387* (2014.10); *C09B 67/0004* (2013.01); *C09C 1/00* (2013.01); *C09C 1/3063* (2013.01); *C09C 3/08* (2013.01); *C09D 11/037* (2013.01); *C09D 11/50* (2013.01);
    (Continued)

(58) Field of Classification Search
    CPC .... B42D 25/29; B42D 25/378; B42D 25/387; Y10T 428/24802
    See application file for complete search history.

(56) References Cited

U.S. PATENT DOCUMENTS

3,884,697 A   5/1975  Inoue et al.
4,367,170 A   1/1983  Uhlmann et al.
              (Continued)

FOREIGN PATENT DOCUMENTS

EP   0327788 A2   8/1989
EP   0728820 A1   8/1996
              (Continued)

OTHER PUBLICATIONS

Bouas-Laurent, Henri et al. "Organic Photochromism—(IUPAC Technical Report)", Pure Applied Chemistry, vol. 73, No. 4, pp. 639-665, 2001.

(Continued)

*Primary Examiner* — Gerard Higgins
(74) *Attorney, Agent, or Firm* — Blakely, Sokoloff, Taylor & Zafman LLP

(57) ABSTRACT

Methods and systems for optical effects in pigments, inks, and on media. One aspect of this disclosure involves a pigment particle which includes a core, having a fluorescent material and having a spherical shape, and a shell surrounding the core; the shell includes a photochromic material which has a first optical property in a first light source and a second optical property in a second light source which includes a set of wavelengths not sufficiently present in the first light source. The second optical property attenuates an emitted radiation from the fluorescent material. Other aspects are also described.

16 Claims, 14 Drawing Sheets

(14 of 14 Drawing Sheet(s) Filed in Color)

Related U.S. Application Data division of application No. 11/173,620, filed on Jul. 1, 2005, now Pat. No. 8,110,281.

(60) Provisional application No. 60/585,365, filed on Jul. 2, 2004.

(51) Int. Cl.

| | | |
|---|---|---|
| *C09C 1/00* | (2006.01) | |
| *C09C 1/30* | (2006.01) | |
| *C09C 3/08* | (2006.01) | |
| *C09D 11/037* | (2014.01) | |
| *C09D 11/50* | (2014.01) | |
| *C09K 9/02* | (2006.01) | |
| *B42D 25/29* | (2014.01) | |
| *B42D 25/387* | (2014.01) | |
| *G07D 7/005* | (2016.01) | |
| *G07D 7/1205* | (2016.01) | |

(52) U.S. Cl.
CPC ............... *C09K 9/02* (2013.01); *G07D 7/005* (2017.05); *G07D 7/1205* (2017.05); *B42D 2035/24* (2013.01); *C01P 2002/84* (2013.01); *Y10S 428/913* (2013.01); *Y10S 428/916* (2013.01); *Y10T 428/24802* (2015.01); *Y10T 428/24893* (2015.01); *Y10T 428/24901* (2015.01); *Y10T 428/25* (2015.01); *Y10T 428/2991* (2015.01)

(56) References Cited

U.S. PATENT DOCUMENTS

| | | |
|---|---|---|
| 5,172,937 A | 12/1992 | Sachetti |
| 5,204,208 A | 4/1993 | Paine et al. |
| 5,208,132 A | 5/1993 | Kamada et al. |
| 5,208,630 A | 5/1993 | Goodbrand et al. |
| 5,385,803 A | 1/1995 | Duff et al. |
| 5,474,715 A | 12/1995 | Tagaya et al. |
| 5,569,317 A | 10/1996 | Sarada et al. |
| 5,630,869 A | 5/1997 | Amon et al. |
| 5,702,511 A | 12/1997 | de Saint-Romain et al. |
| 5,807,625 A | 9/1998 | Amon et al. |
| 5,857,709 A | 1/1999 | Chock |
| 5,932,309 A | 8/1999 | Smith et al. |
| 5,952,131 A | 9/1999 | Kumacheva et al. |
| 6,270,213 B1 | 8/2001 | Sansone et al. |
| 6,525,136 B1 | 2/2003 | Foucher et al. |
| 2002/0071970 A1 | 6/2002 | Elder et al. |
| 2002/0182413 A1 | 12/2002 | Kunitake et al. |
| 2002/0187414 A1 | 12/2002 | Foucher et al. |
| 2003/0087094 A1 | 5/2003 | Smith et al. |
| 2003/0194578 A1 | 10/2003 | Tam et al. |

FOREIGN PATENT DOCUMENTS

| | | |
|---|---|---|
| GB | 2229189 A | 9/1990 |
| WO | WO 83/00568 A1 | 2/1983 |

OTHER PUBLICATIONS

Corns, S. Nigel; Partington, Steven M.; and Towns, Andrew D. "Industrial organic photochromic dyes", The Authors, Journal Compilation a 2009 Society of Dyers and Colourists, Color Technology, 2009,1 pp. 249-261.

Crano, John A. et al. "Organic Photochromic and Thermochormic Compounds—vol. 1: Main Photochromic Families" 1999, Plenum Press, New York, pp. ix-9.

Crano, John A. et al. "Organic Photochromic and Thermochormic Compounds—vol. 2: Physicochemical Studies, Biological Applications, and Thermochromism" 1999, Kluwer Academic/Plenum Publishers, New York, pp. xi-9.

Hobley, Jonathan, et al. "Photochromism of chromene crystals; a new property of old chromenes", The Royal Society of Chemistry 2000, Chem. Commun., 2000, pp. 1339-1340.

Inoue, Eiichi, et al., "Photo-decoloration Process of the Reverse Photochromic Spirans", Imaging Science and Engineering Laboratory, Tokyo Institute of Technology, Ookayama, Meguro-ku, Tokyo, Jul. 20, 1971, pp. 1951-1956.

Keum, Sam-Rok et al. "Unusual Reverse Photochromic Behavior of Indolinobenzospiropyran 6-Carboxylates in Aqueous Binary Solvents", Bull, Lorean Chem. Soc. 2006, vol. 27, No. 2, pp. 187-188.

Liebsch, Gregor et al. "Luminescence Lifetime Temperature Sensing Based on Sol-Gels and Poly(acrylonitrile)s Dyed with Ruthenium Metal-Ligand Complexes," Advanced Materials, 1999, 11(15):1296-1299.

PCT International Preliminary Report on Patentability for PCT application No. US2006/024721, dated Jan. 17, 2008 (9 pages).

PCT International Search Report and Written Opinion for PCT application No. US2006/024721, dated Oct. 11, 2007 (16 pages).

PCT Invitation to Pay Additional Fees for PCT application No. US2006/024721, dated Jul. 30, 2007 (5 pages).

Robinson, James. "Reversacol Photochromic Dyes", James Robinson LTD, sales@james-robinson.ltd.uk, 7 pgs.

Shimizu, Isamu; Kokado, Hiroshi; and Inoue, Eiichi. "Photoreversible Photographic Systems. VI. Reverse Photochromism of 1,3,3-Trimethylspiro[indoline-2,2'-benzopyran]-8'-carboxylic Acid", J. Chem. Soc. Japan Pure Chem Sect.), 89, 155, Jun. 17, 1968, pp. 1730-1734, vol. 42, No. 6.

Sporer, A.H. "Laser marking process in an oriented dye film", IBM Research Laboratory, San Jose, California, 95193, May 15, 1984, Applied Optics, vol. 23, No. 16, pp. 2738-2743, Aug. 15, 1984.

Ueda, Masahide et al. "Photochromic Behaviour of a Spirobenzopyran chemisorbed on a Colloidal Silica Surface," J. Mater. Chem., 1995, 5(7):1007-1011.

Van Blaaderen, A. et al. "Monodisperse Collodial Silica Spheres from Tetraalkoxysilanes: Particle Formation and Growth Mechanism", Journal of Colloid and Interface Science, vol. 154, No. 2, Dec. 1992, pp. 481-501.

Van Blaaderen, A. et al. "Synthesis and Characterization of Collodial Dispersions of Fluorescent, Monodisperse Silica Spheres", Langmuir 1992, (American Chemcial Society, 1992) vol. 8, pp. 2921-2931.

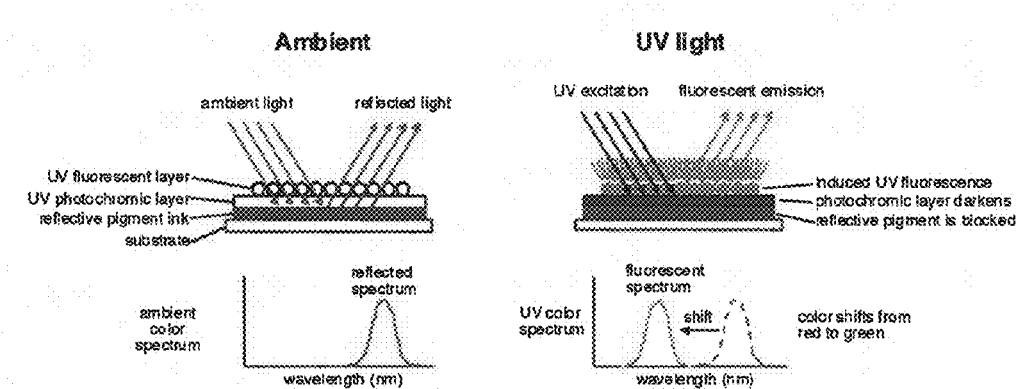
Figure 1. Color shifts from red (reflected) under ambient illumination to green (fluorescence) under UV excitation as the photochromic layer darkens.
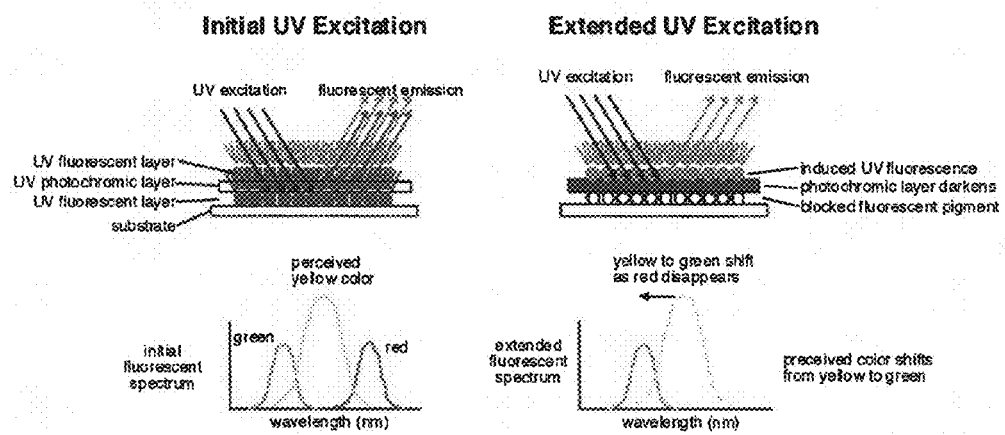
Figure 2. Color shifts from yellow (additive mixture of red and green fluorescent lines) under initial UV excitation, to green only (fluorescence) after the photochromic layer darkens.

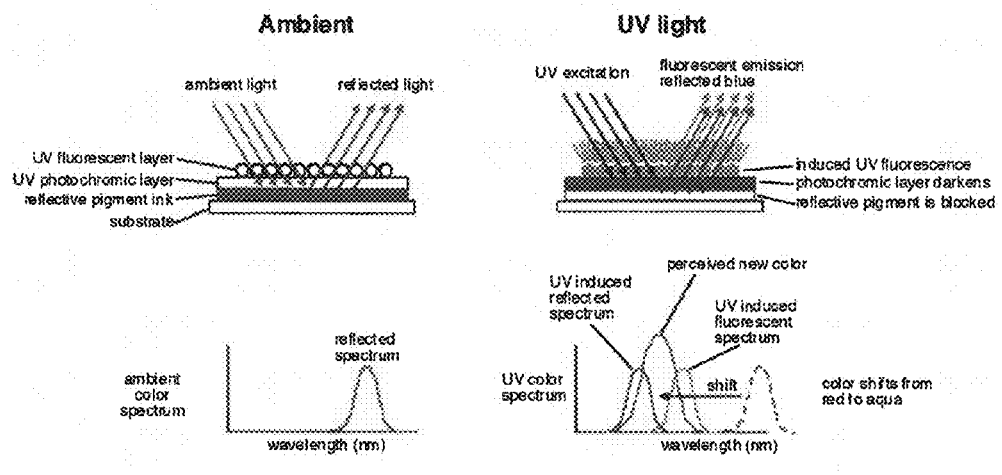
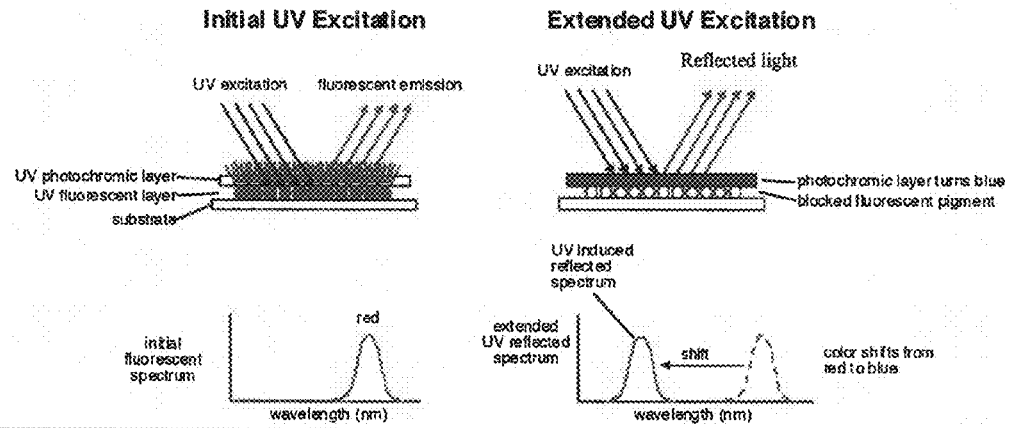

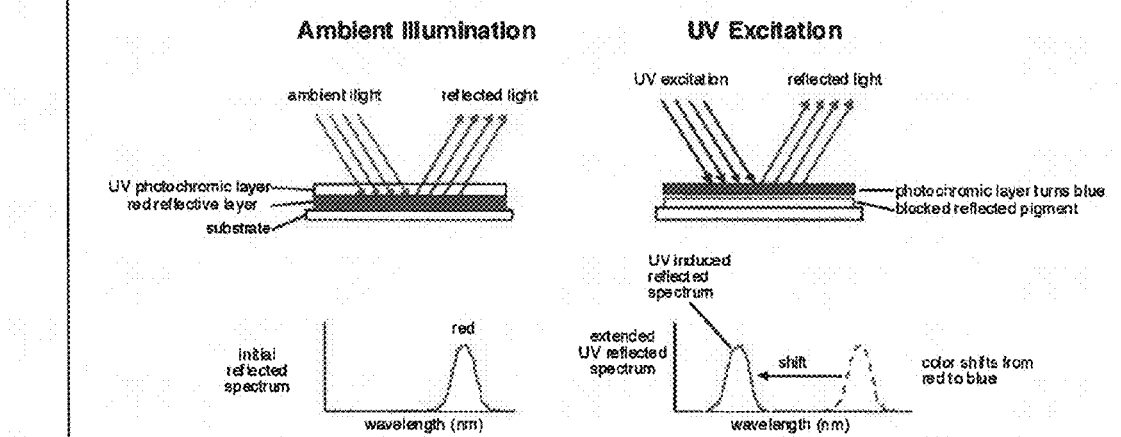
Figure 5  Color shifts from red (reflective) to blue (reflective) under UV excitation as the photochromic layer changes from transparent to blue.

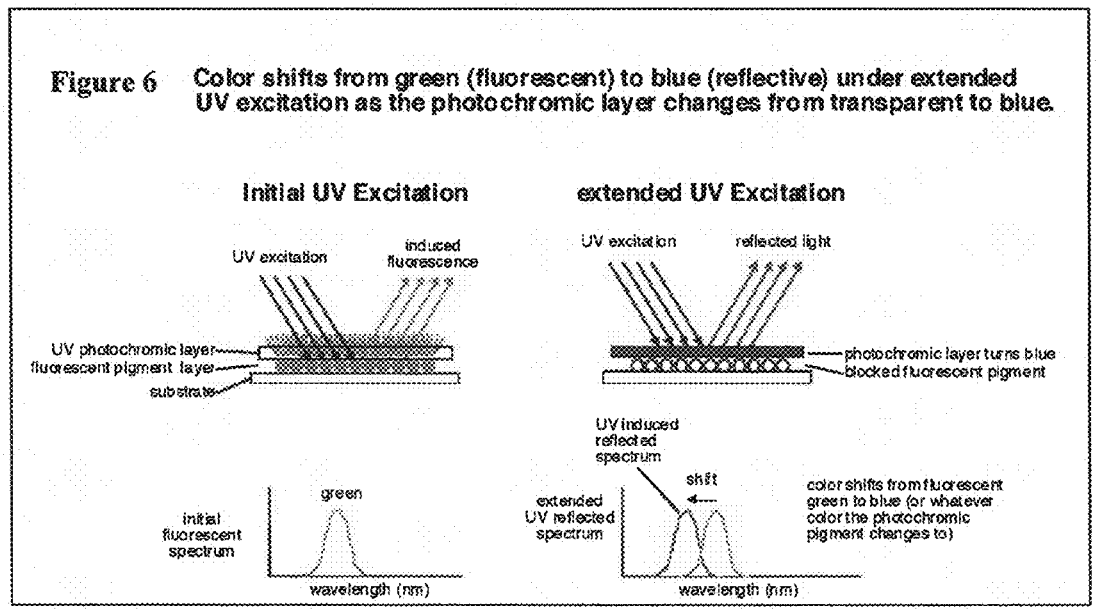
Figure 6  Color shifts from green (fluorescent) to blue (reflective) under extended UV excitation as the photochromic layer changes from transparent to blue.

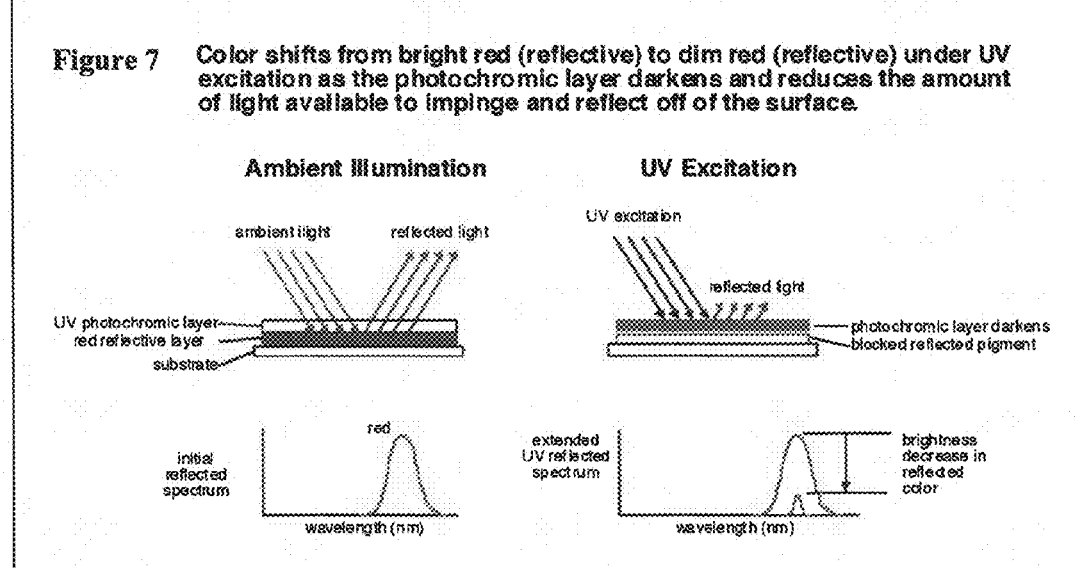
Figure 7  Color shifts from bright red (reflective) to dim red (reflective) under UV excitation as the photochromic layer darkens and reduces the amount of light available to impinge and reflect off of the surface.

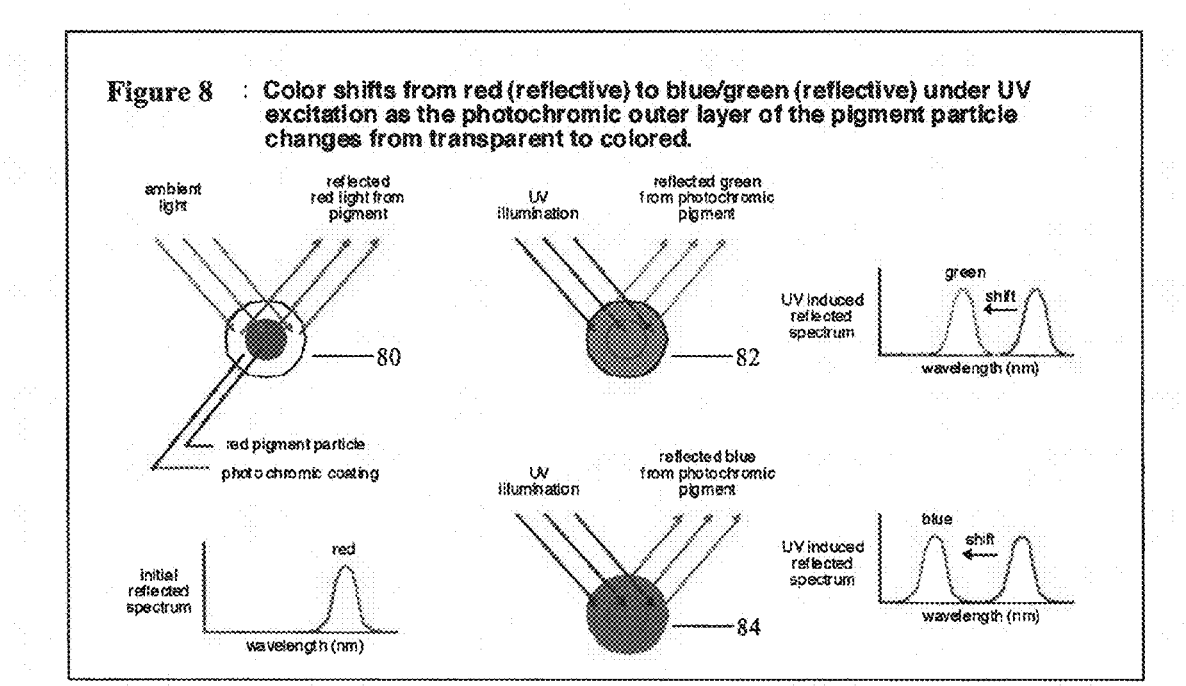

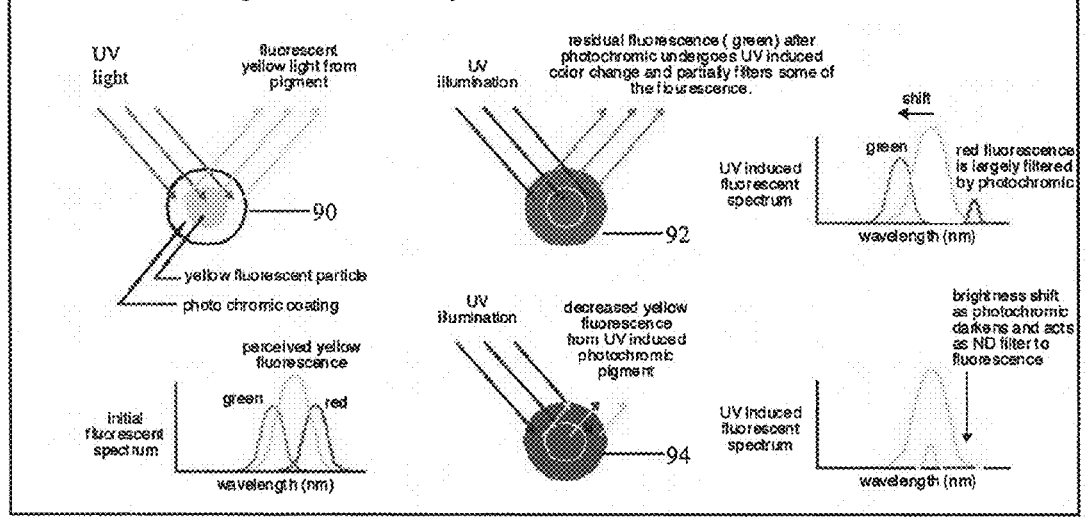

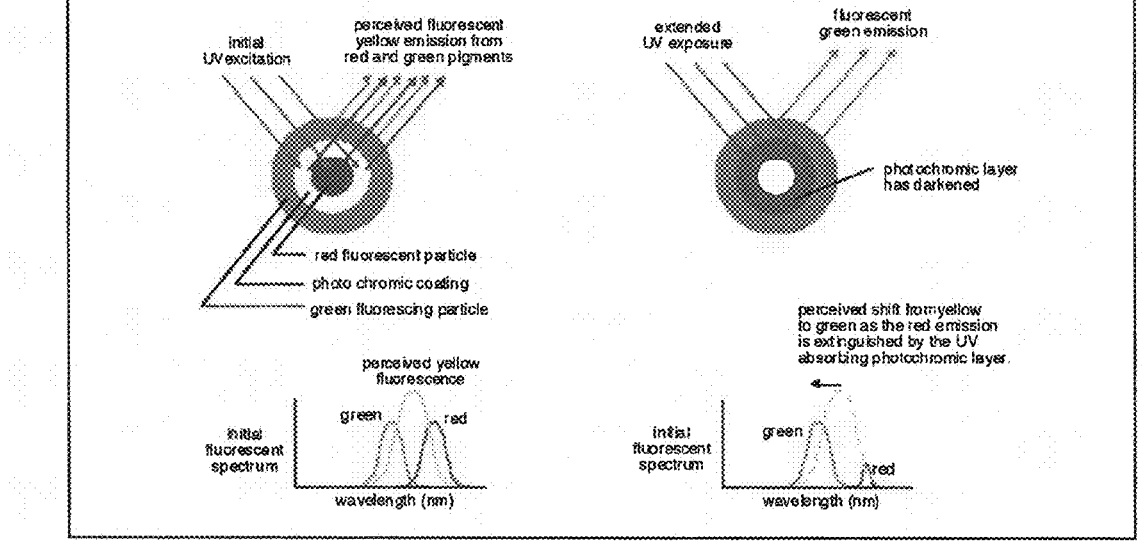

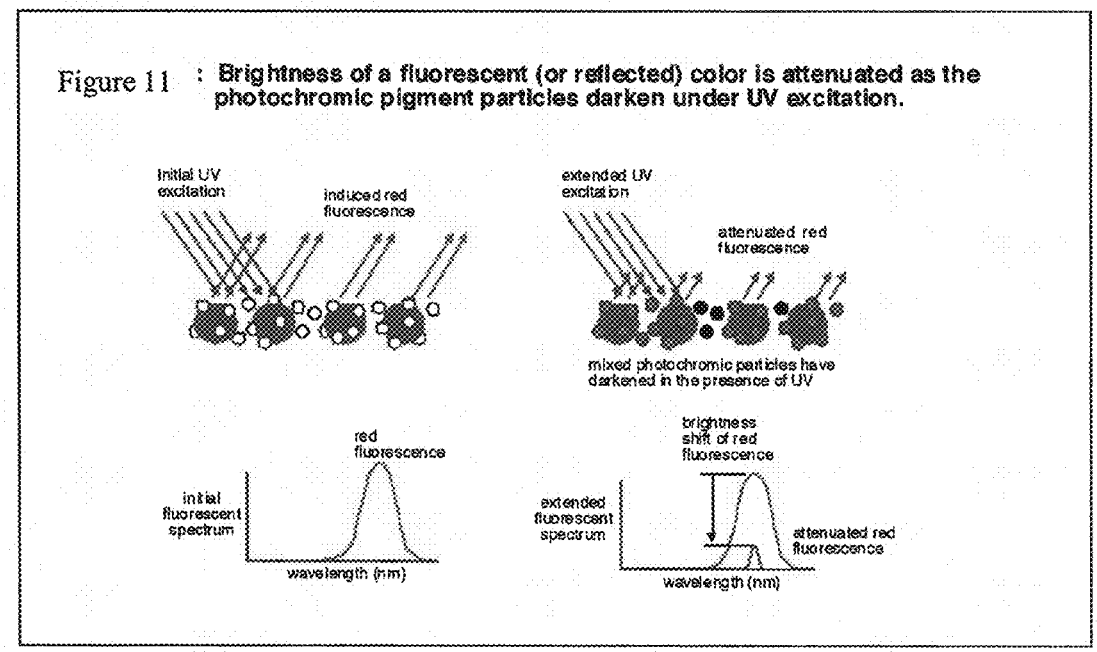

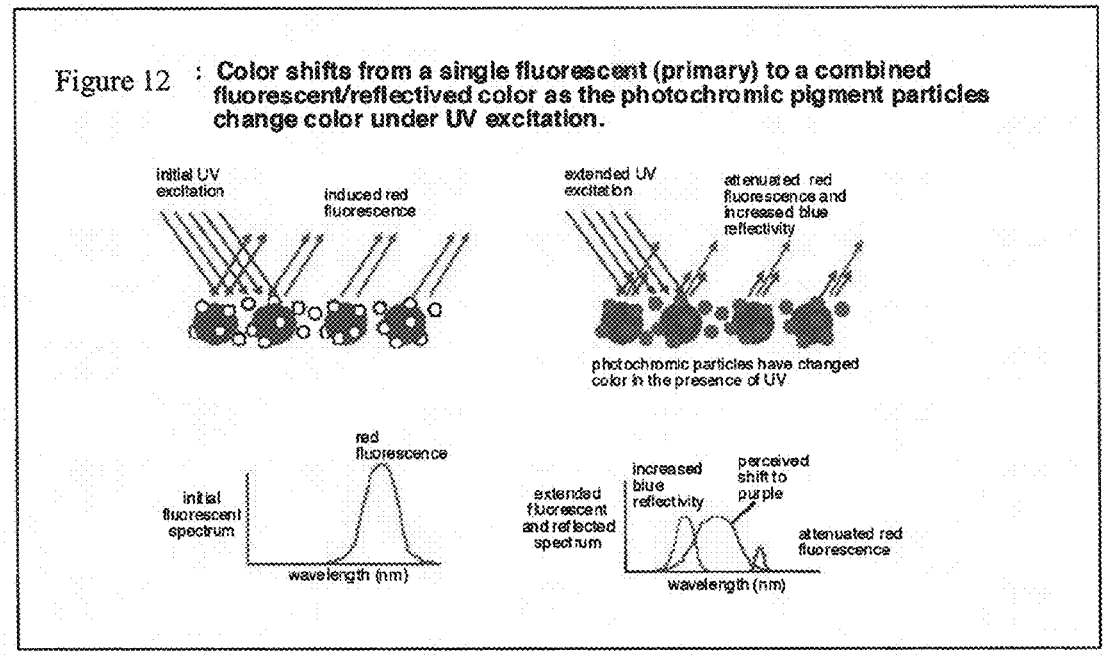

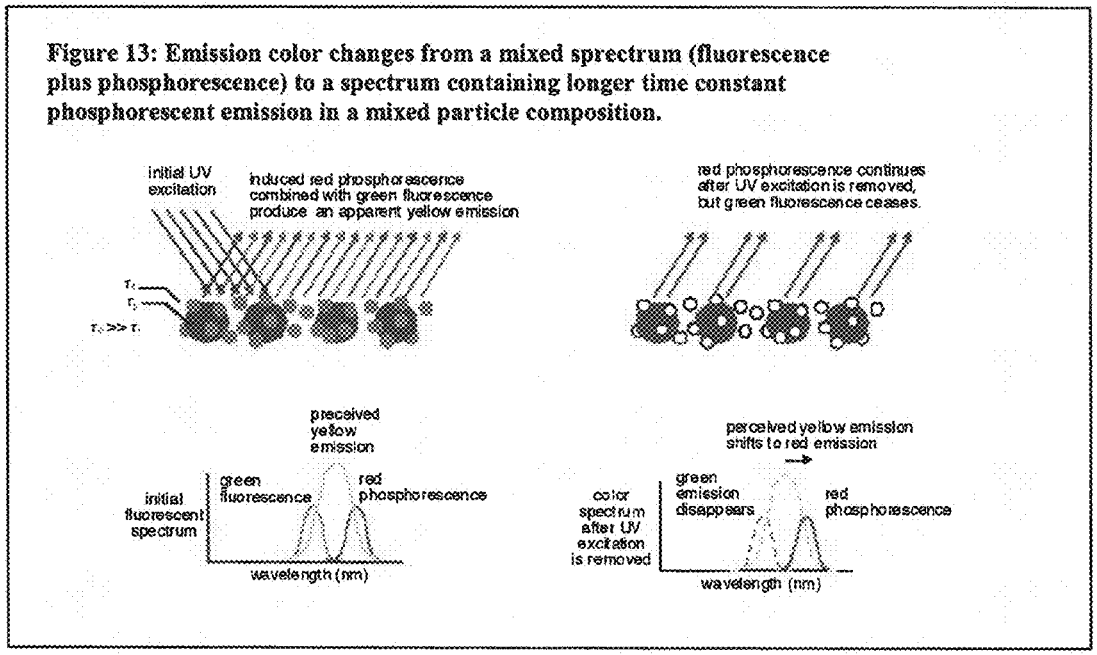

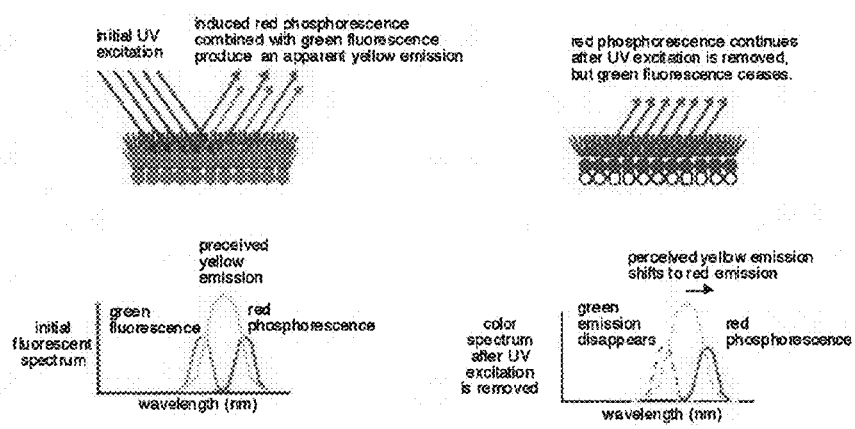
Figure 14: Emission color changes from a mixed sprectrum (fluorescence plus phosphorescence) to a spectrum containing longer time constant phosphorescent emission in a layered ink composition.

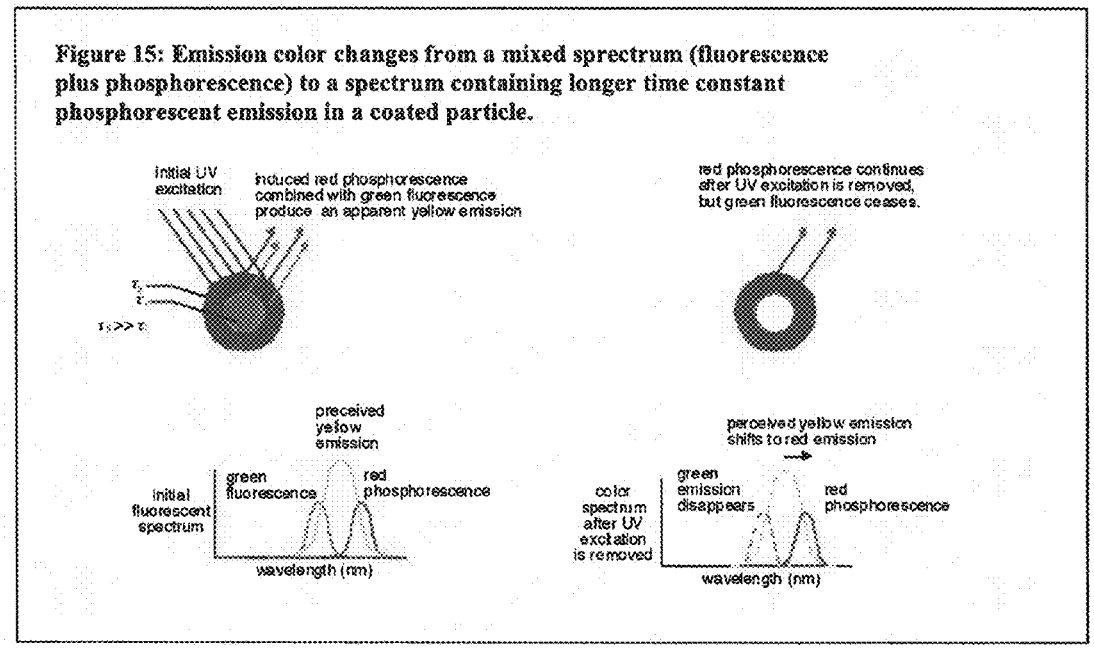

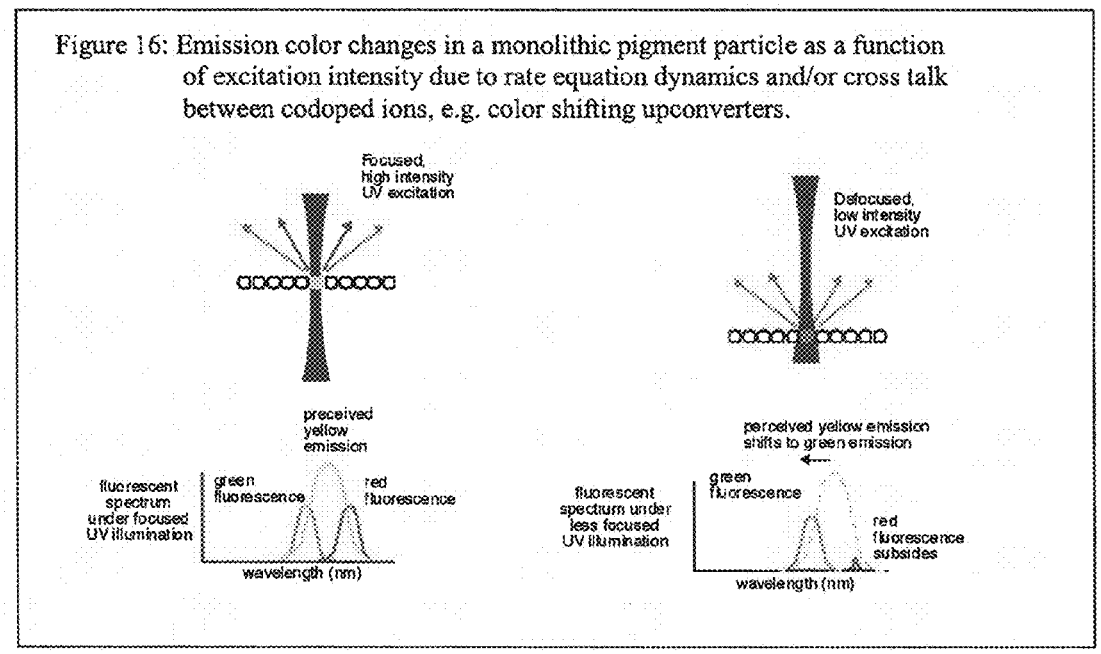
Figure 16: Emission color changes in a monolithic pigment particle as a function of excitation intensity due to rate equation dynamics and/or cross talk between codoped ions, e.g. color shifting upconverters.

SYSTEMS AND METHODS FOR CREATING OPTICAL EFFECTS ON MEDIA

BACKGROUND OF THE INVENTION

This application is a continuation of co-pending U.S. patent application Ser. No. 13/327,744, filed on Dec. 15, 2011, which is a divisional of U.S. patent application Ser. No. 11/173,620, filed on Jul. 1, 2005, which claims priority to U.S. Provisional Patent Application No. 60/585,365, filed on Jul. 2, 2004.

At least certain embodiments of the present inventions relate to pigments, inks, and other materials which may be applied onto media, such as paper, or other materials. These systems and methods may be used as security features or identification features to allow an object to be authenticated.

Existing methods that use UV (ultraviolet) light to activate a visible effect produce only a static emission spectrum. Such features rely on fluorescence in which UV light is absorbed by a material and then re-radiated as a longer wavelength, typically in the visible spectrum. The emitted light is determined by the chemical and electronic structure of the compound and is a material property thereof. The spectrum of the light thus induced does not change under steady-state illumination or under intensity-varying conditions.

Existing methods also include the use of a photochromic material in authentication systems, such as security printing inks. See, for example, *Organic Photochromic and Thermochromic Compounds,* Volume 1, edited by John C. Crano and Robert J. Gugoielmetti, 1999 (ISBN 0-306-45882-9).

SUMMARY

Various embodiments of systems and methods for inducing a dynamic, reversible color-changing property are described in this disclosure. This summary sets forth certain embodiments but not necessarily all embodiments which are described herein.

In one embodiment, a pigment particle includes a core having a carrier substance and a fluorescent material (or a phosphorescent material), wherein the core has a substantially spherical shape, and the pigment particle also includes a shell which surrounds the core, and the shell includes a photochromic material which has a first optical property when illuminated by a first light source and a second optical property when illuminated by a second light source, which includes a set of wavelengths not sufficiently present in the first light source, and wherein the second optical property attenuates an emitted radiation from the fluorescent material. In at least certain embodiments, the first optical property is substantially transparent and the second light source includes ultraviolet wavelengths which are the set of wavelengths not sufficiently present in the first light source. The UV excitation from the UV in the second light source initially causes the pigment particle to have a first appearance based on the fluorescent emissions (e.g. the fluorescent emissions at least in part effect the first appearance by having an effect of the color of the first appearance). Continued UV excitation causes the pigment particle to have a second appearance based on the second optical property of the photochromic material which attenuates an emitted radiation from the fluorescent material. Typically, the first appearance is a first color based in part upon the fluorescent emissions from the fluorescent chromophore (a fluorescent material) and the second appearance is a second color which is different than the first color. Also typically, the photochromic material changes from the first optical property to the second optical property, while under UV illumination from the second light source, over a period of time of more than about one-third of a second to as long as about 30 seconds. This pigment particle may be mixed with an ink, and the ink can be used to print onto currency or other objects to create an indicia or identification feature on the object. The identification feature can be authenticated by illuminating the indicia with a UV light source to thereby cause the color change, under the continued UV illumination, from the first color to the second color. Thus, the pigment particle may be used in currency to authenticate the currency or on other objects to authenticate or identify the object. Further, this pigment particle can also be used to produce decorative or attention-grabbing features, for instance, on products or packaging.

In another exemplary embodiment, an object includes a substrate and an indicia which includes a first material and a second material. The first material is coupled to the substrate and the second material is coupled to the substrate. The first material has a first optical appearance before UV excitation and a second optical appearance after receiving UV excitation. In at least certain embodiments, the first material is a photochromic substance which is transparent under ambient light which has insufficient amounts of ultraviolet light and darkens or reflects a color in the presence of UV excitation. In this case, the first optical appearance is transparency and the second optical appearance is a darkened or colored appearance after receiving UV excitation. In other embodiments, a saturable absorber may be used as the first material rather than a photochromic material or substance. The second material may be a fluorescent chromophore or a non-fluorescent pigment which is capable of providing the color. The indicia appears to radiate a first color upon initial UV excitation while the first material has the first optical appearance, and then over a short period of time, appears to radiate a second color upon continued UV excitation as the first material has changed to the second optical appearance. The first material typically attenuates the fluorescent radiation from the fluorescent chromophore, and the first color is based at least in part on the fluorescent radiation from the fluorescent chromophore (e.g. at least a portion of the spectrum of this first color is dependent upon the fluorescent chromophore). The second color may be based upon reflections from the first material in the second optical appearance, or may be based upon the fluorescent radiation from a third material which is a fluorescent chromophore. The photochromic material typically changes from the first optical appearance to the second optical appearance over a short period of time, such as a period of more than about a third of a second to a period of less than about 30 seconds, such that the first color is visible for at least about a third of a second to as long as 30 seconds. The object may be currency and the indicia created by the first and second material may be an authentication or an identification feature placed on the currency through a printing process or through other methods of applying the material onto a media.

In yet another embodiment of the inventions described herein, the object includes a substrate and an indicia disposed on the substrate, wherein the indicia includes a first material and a second material, each of which are coupled to the substrate. The first material has a first optical appearance when illuminated by a light source which does not include a sufficient amount of UV wavelengths and a second optical appearance after receiving sufficient UV excitation from a light source containing a sufficient amount of UV wavelengths. The indicia appears to radiate a first color at a first intensity upon initial UV excitation while the first material has the first optical appearance (e.g. the first optical appearance is transparent for a photochromic material) and then appears to radiate the first color at a second intensity upon continued UV excitation as the first material has changed to the second optical appearance. In at least certain embodiments, the second material may include a fluorescent chromophore which emits fluorescent radiation in response to UV illumination, and the first material includes a photochromic material or substance which, when having the second optical appearance, attenuates the fluorescent radiation from the fluorescent chromophore and wherein the first color is based upon the fluorescent radiation from the fluorescent chromophore (e.g. at least a portion of the spectrum of the first color is derived or based upon the fluorescent emission from the fluorescent chromophore).

Various methods for authenticating or identifying objects by using an indicia or features on the object are also described herein. In one exemplary method, a material on the object is exposed to a set of wavelengths, and the user observes radiation or emission of a first color in response to the exposing, and the user observes a radiation of a second color, also in response to the exposing and after the observing of the radiation of the first color. By observing both the first and second color while under the same illumination source, such as an ultraviolet light source, and by observing the change over a short period of time, the user can determine the authenticity of the object if it displays the anticipated color change from the first color to the second color in a short period of time. The material may have an initial color prior to the exposing, and the material may appear to change from this initial color, then to the first color, and then to the second color in response to the exposing and, after the exposing has stopped, the material reversibly returns to the initial color. The time between changing from the first color to the second color is typically more than about one-third of a second to less than 30 seconds, such that the first color is visible for at least about a third of a second to as long as 30 seconds. Typically, at least in certain embodiments, the material may be a photochromic material and may also include a fluorescent material.

Another exemplary method to authenticate an object includes exposing a material with an illumination at a first intensity and emitting, in response to the illumination at the first intensity, a first color, and exposing the material with an illumination, such as an ultraviolet illumination, at a second intensity and emitting, in response to the illumination at the second intensity, a second color. Typically, the illumination is of the same frequency but different intensities, and the material includes a first fluorescent material having a first efficiency and a second fluorescent material having a second efficiency which is significantly less than the first efficiency. The imbalance in the efficiencies causes the fluorescent chromophore which has the much higher efficiency to dominate the resulting emissions spectrum when the illumination source is at a lower intensity. When the illumination source is at a higher intensity, then both fluorescent chromophores can effect the resulting fluorescent spectrum, and the color will appear slightly different than the resulting color at the lower illumination intensity.

Other exemplary embodiments include an object which comprises a substrate, a pigment coupled to the substrate, an absorption varying material, such as a photochromic substance, coupled to the pigment and disposed over the pigment, and a fluorescent material, such as a fluorescent chromophore, coupled to the absorption varying material and disposed over the absorption varying material. The absorption varying material changes its optical property in the presence of ultraviolet or other types of illumination to cause a change in the appearance of the combination of the pigment, the absorption varying material, and the UV fluorescent material, which together may form an indicia on the object.

In yet another exemplary embodiment, an object includes a substrate and an indicia which includes a fluorescent material and a phosphorescent material. The fluorescent material emits a fluorescent radiation when under illumination from a radiation source, such as an ultraviolet light source, and the phosphorescent material phosphoresces a phosphorescent radiation when under illumination from the radiation source (e.g. a UV light source) and continues to phosphoresce for a period of time after the illumination has stopped.

Other objects, indicia, pigment particles, and methods for using these objects are described further below.

BRIEF DESCRIPTION OF THE DRAWINGS

The present inventions are illustrated by way of example and not limitation in the figures of the accompanying drawings. The patent or application file contains at least one drawing executed in color. Copies of this patent or patent application publication with color drawing(s) will be provided by the Patent and Trademark Office upon request and payment of the necessary fee.

FIG. 1 shows an exemplary object displaying a color shift in response to a change of illumination.

FIG. 2 shows an object that displays a color shift in response to continued illumination from a light source, such as an ultraviolet light source.

FIG. 3 shows another exemplary object that displays a color shift in response to a change of illumination (e.g. a change from ambient light which has an insufficient amount of ultraviolet radiation to illumination under an ultraviolet light source).

FIG. 4 shows an exemplary object that displays a color shift in response to continued illumination from a light source, such as an ultraviolet light source.

FIG. 5 shows an exemplary object that displays a color shift in response to a change of illumination.

FIG. 6 shows an exemplary object that displays a color shift in response to continued illumination from a light source, such as an ultraviolet light source.

FIG. 7 shows another exemplary object that displays a color shift in response to a change of illumination.

FIG. 8 shows another exemplary object, which may be a pigment particle, that displays a color shift in response to a change of illumination.

FIG. 9 shows another exemplary object, such as a pigment particle, that displays a color shift in response to a continued illumination from a light source, such as an ultraviolet light source.

FIG. 10 shows another exemplary object, such as a pigment particle, that displays a color shift in response to continued illumination from a light source.

FIG. 11 shows another exemplary object that displays a color shift in response to continued illumination from a light source.

FIG. 12 shows another exemplary object that displays a color shift in response to continued illumination from a light source.

FIG. 13 illustrates pigment particles which include fluorescent material and phosphorescent materials which exhibit one color under initial UV excitation and another color after the UV excitation is removed, and the red or other color phosphorescence continues after the UV excitation is removed.

FIG. 14 illustrates another exemplary object which includes phosphorescent and fluorescent materials.

FIG. 15 shows another exemplary object, such as a pigment particle, that includes both fluorescent material and phosphorescent material which may be used in indicia of the present invention.

FIG. 16 shows another exemplary object, such as pigment particles, which may be used in indicia according to the methods and systems of the present invention.

DETAILED DESCRIPTION

The subject inventions will be described with reference to numerous details set forth below, and the accompanying drawings will illustrate the inventions. The following description and drawings are illustrative of the inventions and are not to be construed as limiting the inventions. Numerous specific details are described to provide a thorough understanding of the present inventions. However, in certain instances, well known or conventional details are not described in order to not unnecessarily obscure the present inventions in detail.

This disclosure describes methods and techniques for creating dynamic color-changing effects on substrate material that can be induced by exposure to, for example, ultraviolet radiation. A substrate thus prepared can be readily differentiated from ones that contain only reflective regions or UV fluorescent regions. Such effects can be used to produce security and identification features on currency, branded products, documents, and other substrate material. They can also be used to produce decorative or attention-grabbing features on, for instance, products and packaging.

At least certain embodiments described herein provide a means of using UV light, under either steady-state conditions or intensity varying conditions, to excite visible light (and IR) with a color spectrum that changes quickly with time (e.g. in as short as about one-third of a second to as long as about 30 seconds). Such features can be used to provide a greatly enhanced overt feature for currency and other secure documents and branded products. For example, such features applied to currency may allow for the detection of counterfeit currency.

The pigments, inks/coatings, and printing/coating processes that make up the color-changing features of at least certain embodiments of these inventions provide unique ways to enable a person with a low-cost radiation source, such as a UV light, to interrogate a secure document such as a bank note or currency. Unlike existing UV induced features, which merely fluoresce with a constant color spectrum under UV illumination, the color changing embodiments described herein provide a dynamic color changing effect that is very unique and not currently available on any document. When these features are integrated onto substrate material via printing or coating with an ink (varnish, etc.) using one (or a combination) of the described methods, and subsequently exposed to UV light, they will provide an unmistakable overt or semi-covert feature where applied. (Various methods for integrating the features into a substrate, beyond printing, such as injection molding, casting, painting, dipping, etc. can also be used to produce the feature and as such, the embodiments are not limited merely to printing applications.)

The fundamental properties of the materials to be integrated onto substrates and used for these embodiments may include four fundamental types. The first is fluorescent materials, which emit visible and/or IR light upon absorption of UV light. The second is photochromic materials, which darken or otherwise change their absorption spectrum in response to UV. Both positive and negative photochromic materials may be used. In certain embodiments, thermochromic substances may be used in place of or in addition to the photochromic substances. The third is saturable absorbers, which initially absorb but become transparent as the transitions become saturated. The fourth is materials that undergo an internal energy transfer mechanism in the presence of UV as a function of intensity. Intensity, defined as energy per unit time per unit area, provides the control variables for effecting the fourth change.

Materials with the above mentioned properties can be synthesized into pigments, small particles, coatings, sprays, inks, or other media, which can be applied to substrates to create objects with indicia which may be used to authenticate or identify the object. Application processes include mixing small particles of materials with these properties into inks and coatings, and printing them onto surfaces. Multiple materials can be mixed together to provide a coating with combined features. Additionally, multiple layers can by applied on top of one another to provide dynamic responses to UV excitation. Additionally, coated regions having different responses to UV can be applied in close proximity to provide an even larger array of dynamic responses. Photochromic materials are described in an article titled "Organic Photochromism" by H. Bouas-Laurent and Heinz Durr, *Pure Applied Chem.*, 73:4, pp. 639-665 (2001); this article is incorporated herein by reference.

Categorization of Color-Changing Effects

The concepts disclosed in the following figures (FIGS. 1-16) for integrating UV-induced color changing effects into pigments and media can be broken down systematically into the following categories describing the functional exposure method for how the color changing mechanism is induced:

a.) Color change occurs upon moving the substrate from ambient (visible room) light to UV light. (Exposure spectrum changes to induce the effect)

b.) Color change occurs under extended (typically about a few seconds, such as about 3 seconds to 7 seconds) exposure to UV light. (Effect is typically induced under constant exposure spectrum)

c.) Color change occurs upon moving substrate from UV to ambient light or from UV to no light. (Exposure spectrum changes to induce the effect)

d.) Color change occurs under different intensities of UV exposure (focused vs. nonfocused). (Intensity of exposure changes, but not spectrum of exposure, to induce the effect)

These categories can be further broken down into monolithic vs. mixed pigment types, and even further into single layer vs. multi-layer application requirements.

1. Monolithic pigments (a single pigment exhibits all of the effects)
    i. in conjunction with UV induced photochromic/saturable absorbers
    ii. in conjunction with UV induced photochromic/saturable reflectors
    iii. multiple emission/reflection wavelengths
    iv. multiple emission lifetimes
    v. involving intensity dependent cross sections and/or energy transfer
    vi. single emission/reflection wavelengths
2. Mixed pigments (multiple pigments are used to achieve the effect)
    i. in conjunction with UV induced photochromic/saturable absorbers
    ii. in conjunction with UV induced photochromic/saturable reflectors
    iii. multiple emission/reflection wavelengths iv. multiple emission lifetimes
v. involving intensity dependent cross sections and/or energy transfer
vi. single emission/reflection wavelengths The following charts categorically detail these various concepts for integrating color-changing effects into pigments and printed/coated media. Each concept is shown in the corresponding figure which is labeled with the same number; for example, concept 16 is shown in FIG. 16. Combinations of the effects can be used to provide additional color-changing performance.

a. Change Occurs Upon Moving Pigments/Substrate from Ambient (Room) Light to UV Light

| | Pigment Type | | | | | | Print Layers | | Performance | | | | | |
|---|---|---|---|---|---|---|---|---|---|---|---|---|---|---|
| | Monolithic | | | Mixed | | | | | | | | | | |
| Concept | fluorescent | reflective | fluor/refl | fluorescent | reflective | fluor/refl | Single | Multiple | I | ii | iii | iv | v | vi |
| 1 | | | | | | x | | x | x | | x | | | |
| 3 | | | | | | x | | x | | x | x | | | |
| 5 | | | | | x | | | x | | x | x | | | |
| 7 | | | | | x | | | x | x | | | | | |
| 8 | | x | | | | | x | | | x | x | | | | b. Color Change Occurs Upon Extended (Few Seconds) Exposure to UV Light.

| | Pigment Type | | | | | | Print Layers | | Performance | | | | | |
|---|---|---|---|---|---|---|---|---|---|---|---|---|---|---|
| | Monolithic | | | Mixed | | | | | | | | | | |
| Concept # | fluorescent | reflective | fluor/refl | fluorescent | reflective | fluor/refl | Single | Multiple | I | ii | iii | iv | v | vi |
| 2 | | | | x | | | | x | x | | x | | | |
| 4 | | | | | x | | | x | | x | x | | | |
| 6 | | | | | x | | | x | | x | x | | | |
| 9 | | x | | | | | x | | x | x | | | | x |
| 10 | x | | | | | | x | | x | x | | | | |
| 11 | | | | | x | | x | x | x | | | | | x |
| 12 | | | | | x | | x | | | x | | | | | c. Color Change Occurs Upon Moving Pigment/Substrate from UV to Ambient Light or from UV to no Light.

| | Pigment Type | | | | | | Print Layers | | Performance | | | | | |
|---|---|---|---|---|---|---|---|---|---|---|---|---|---|---|
| | Monolithic | | | Mixed | | | | | | | | | | |
| Concept # | fluorescent | reflective | fluor/refl | fluorescent | reflective | fluor/refl | Single | Multiple | I | ii | iii | iv | v | vi |
| 13 | | | | | | x | x | | | | x | | | |
| 14 | | | | | | x | | x | | | x | x | | |
| 15 | x | | | | | | x | | | | x | x | | | d. Color Change Occurs Upon Exposure to Varying Intensities of UV Light, ie, Focused vs Nonfocused.

| | Pigment Type | | | | | | Print Layers | | Performance | | | | | |
|---|---|---|---|---|---|---|---|---|---|---|---|---|---|---|
| | Monolithic | | | Mixed | | | | | | | | | | |
| Concept # | fluorescent | reflective | fluor/refl | fluorescent | reflective | fluor/refl | Single | Multiple | I | ii | iii | iv | v | vi |
| 16 | x | | | | x | | | | | | | | x | x |

In addition to undergoing the described change in appearance, it may be necessary or desirable in some instances for the feature to revert to the original (or closely thereto) condition that it existed in prior to UV exposure. Additionally, it may be desirable for the feature to undergo the cycle of changing under UV and returning closely to its original condition a large number of times. In order for this to happen, the fluorescent materials should emit their absorbed energy and return to their unexcited states. The photochromics and saturable absorbers must also lose any stored or trapped energy and return close enough to their original states so that the process can be cycled. The ability to undergo multiple numbers of cycles of the feature is thereby a component of exemplary embodiments of at least some of these inventions.

In other instances, it may be desirable for the feature to remain, at least partially, in its altered state. Photochromics with very stable open forms can provide very long-lived features for such a performance requirement. Thus, permanently altered or long-lived alterations to the color spectrum of the feature upon UV excitation is a further aspect of at least certain embodiments of the inventions. In many of the embodiments described herein, a phosphorescent material may be used in place of a fluorescent material. The primary difference between these materials is that the phosphorescent material continues to emit radiation for a short period of time after the excitation illumination (e.g. UV) has been stopped.

The embodiment of FIG. 1 uses multiple layers of material to achieve the desired effect. In this embodiment a reflective pigment (shown red) would be applied to a substrate (e.g. paper for a currency or another object), followed by the application of an absorption varying material (photochromic or saturable absorber), followed by a UV fluorescent pigment (shown green). Under ambient visible light, the photochromic material is transparent, and the UV fluorescer is colorless, so the substrate material appears red to the observer. When exposed to UV light, the fluorescer begins to emit green light, which in conjunction with the reflected red, changes the appearance of the substrate to a color representing a mixture of these wavelengths (red+green). As the photochromic begins to darken, light is blocked from the red reflective pigment, and the observed color that is delivered to the observer from the substrate contains only the fluorescent emission (i.e., green). Thus, the original red color of the substrate undergoes a color shift (from red to yellow to green in this example) when the substrate is exposed to UV radiation. Though red and green have been used as representative colors in this example, clearly other wavelengths could be used, including IR components which would provide the effect for machine-reading interrogation systems.

The use of a saturable absorber in place of the photochromic would effectively cause the intermediate layer between the colors to bleach from opaque to transparent yielding an exposure induced color spectrum that combined the fluorescent emission (shown green) with the reflected spectrum (shown red), rather than only the fluorescent color. In this case, the emission presented to the observer would start out with the reflected color of the saturable absorber, then turn to green (fluorescence) then to yellow as the absorber faded and red could show through. Though the following concepts will be described in terms of photochromics, the effects can also be induced with the use of saturable absorbers used in place thereof.

It should be noted that in addition to visible emission lines, each of these embodiments can incorporate non-visible emission lines (UV and IR) that can be detected with appropriate photodetectors, thereby providing additional functionality for the material as a security feature.

The embodiment of FIG. 2 uses multiple layers of material to achieve the desired effect. A fluorescent layer (shown in red in FIG. 2) is applied to the substrate first, followed by a photochromic (or saturable absorber) layer, followed by another fluorescent layer (shown as green in FIG. 2). Under ambient room light conditions, both the fluorescent pigments and the photochromic layer will nominally be colorless, possibly even enabling a reflective layer to show through from beneath the red fluorescent layer. The initial color spectrum presented to the observer upon exposure to UV will thus be a mixture of fluorescence from both the red fluorescent layer and the green fluorescent layer (red+green=yellow). As the photochromic layer darkens, and begins to reduce both the UV excitation from the red under layer and its emission, the observed color spectrum will shift from yellow (mixed) to green (top layer).

If a saturable absorber is used instead of a photochromic, then the spectrum will shift in the reverse order, namely from fluorescent green to fluorescent yellow as the red fluorescence is enabled.

This embodiment has advantages over the one described in connection with FIG. 1 in that it can be induced entirely with UV light in the absence of any visible light.

The embodiment of FIG. 3 uses multiple layers of material to achieve the desired effect. A reflective layer (shown red) is applied first to the substrate, followed by a photochromic (or saturable absorber) layer that undergoes a change from transparent (a first optical property or appearance) to a color (a second optical property or appearance) other than gray or brown (shown blue), followed by a fluorescent layer (shown green). Under ambient illumination the substrate appears red to the observer. When exposed to UV, the spectrum emitted from the substrate will initially be a combination of reflected red and fluorescent green (yellow). As the photochromic a material takes on its characteristic blue color, and suppresses the red, the substrate spectrum as presented to the viewer will consist of components from the fluorescent layer (green) and the reflected photochromic layer (blue). Thus it will appear, at least for this example, to shift from yellow to aqua in appearance.

If a saturable absorber is used instead of a photochromic material, and a transition from reflected blue to transparent occurs in this layer, then the color spectrum will shift from aqua (fluorescent green+reflected blue) to yellow (fluorescent green+reflected red).

The embodiment of FIG. 4 uses multiple layers of material to achieve the desired effect. The first layer contains a fluorescent material (shown red), and the second layer contains a photochromic layer that changes from transparent to blue. Both layers are colorless under ambient illumination, possibly allowing a reflective under-layer to show through. Upon exposure to UV, the initial spectrum emitted from the substrate will appear red (from a red fluorescent emission). As the photochromic layer begins to turn blue, it will suppress the red fluorescence and the color spectrum emitted by the substrate will shift first to purple (red+blue) then to blue.

As with the previous embodiments, a saturable absorber or reverse-saturable absorber can be used in place of or in addition to a photochromic to provide a different shift in the color spectrum. Combining features thusly would enable for instance, two (or more) features in the same vicinity on a substrate to undergo opposite color shifts simultaneously.

An example might include a red to green shifting region next to a green to red shifting region on the same object.

The embodiment of FIG. 5 uses multiple layers of material to achieve the desired effect. A reflective layer (red) is applied to the substrate, followed by a photochromic (or saturable/reverse saturable absorber) layer that changes to a color (shown blue) under UV excitation. Ambient light that reflects off of the surface of the feature will provide red emission to the observer. Upon exposure to UV, the red color will shift to blue as the photochromic material darkens and begins to reflect blue from both the UV lamp and from the room.

The embodiment of FIG. 6 uses multiple layers of material to achieve the desired effect. A fluorescent layer (shown green) is applied to the substrate, followed by a photochromic (saturable/reverse saturable absorber) layer that changes to a color (shown blue) upon excitement with UV. Both layers are fairly colorless and featureless under ambient light, perhaps showing a reflective pigment below the fluorescent pigment layer. When excited with UV, the fluorescent layer begins to absorb and emit light, providing a color spectrum to the observer that is largely green in the example of FIG. 6. As the photochromic layer begins to darken and turn blue, the color spectrum shifts to that of reflected blue in the example of FIG. 6.

An additional manner in which this feature can be used is to filter out a part of the fluorescent spectrum so that other portions of it continue to emit. Appropriate control of the concentration of the photochromic pigment in the carrier can provide for some amount of continuous through put of UV to the underlying fluorescent layer, allowing it to continuously absorb and emit light. The UV induced colored photochromic layer can be selected to absorb only a portion of this spectrum, passing the remainder. In this manner, fluorescence from the under layer can always constitute a portion of the dynamic spectrum, both before and after the photochromic layer changes between its optical properties.

The embodiment of FIG. 7 uses multiple layers of material to achieve the desired effect. Under ambient light the substrate emits a reflected (shown red) spectrum to the observer. Under UV excitation, the photochromic layer darkens and the reflected red spectrum diminishes in intensity. The color does not change spectrally but the brightness of the color does.

The embodiment of FIG. 8 uses multiple layers of material integrated into individual particles to achieve the desired effect. By integrating some or all of the overall layered performance into a heterogeneous particle, instead of separating each feature into different particles, the requirement to print/apply multiple layers of material can be reduced, thereby simplifying the application process.

This pigment contains an inner reflective (shown red) core, coated with a photochromic material that will (reversibly) change from transparent to colored (shown blue for particle 82 or green for particle 84) when exposed to ultraviolet radiation of the appropriate wavelength and intensity. The particles are applied to the substrate in sufficient manner and quantity to achieve the desired effect under the requisite exposure conditions. The particle 80 shows the appearance of the particle in ambient room lighting (e.g. conventional incandescent bulbs or fluorescent tubes) which lacks a sufficient amount of UV radiation or wavelengths to cause fluorescence or to cause darkening of the photochromic material.

The embodiment of FIG. 9 integrates multiple spectral functionalities into a layered particle system. This particle consists of a fluorescent inner core (shown yellow in particle 90), coated with a photochromic layer that will change to a color (shown blue in particle 92) or darken (shown gray in particle 94). The core may have a substantially spherical shape, and the photochromic layer may be a shell which surrounds the core. Under normal ambient lighting conditions the particle is relatively colorless, enabling it to be non-apparent to an observer. Its colorless properties in ambient light also enable it to be coated over reflective regions, which are intended to be colored for some designated purpose. When exposed to UV radiation, the colorless pigments begin to fluoresce (yellow) as in particle 90 and the photochromics then begin to darken or change color to produce the resulting particle 92 or 94.

The photochromics that change color can act as a filter to the fluorescent light, absorbing some of it and transmitting other frequency bands so as to cause the initial (yellow) spectrum to shift to green (as in the case of particle 92) as the red component of the multi-component spectrum is absorbed and the green is transmitted. Photochromics that darken in more of a neutral density (broad spectrum) manner, rather than filtering out specific bands, can be used to reduce the overall brightness of the pigment. Thus the effect would be to reduce the brightness of the original color rather than to change it by very much (which is shown as the case of particle 92).

The core may be formed using any one of a variety of methods for forming a carrier substance with a pigment such as a fluorescent chromophore. Examples of such methods are described in the following articles: "Monodisperse Colloidal Silica Spheres from Tetraalkoxysilanes: Partial Formation and Growth Mechanism," A. Van Blaaderen, J. Van Geest, and A. Vrij, *Journal of Colloid and Interface Science,* 154:2, (December 1992); and "Synthesis and Characterization of Colloidal Dispersions of Fluorescent, Monodisperse Silica Spheres," A. Van Blaaderen and A. Vrij, *Langmuir,* 8:12, (1992). The shell may be formed using any one of a variety of methods for depositing or precipitating the materials of the shell onto the core. Examples of shell formation methods are described in: "Photochromic Behaviour of a Spirobenzopyran chemisorbed on a Colloidal Silica Surface," M. Ueda, K. Kudo and K. Ichimura, *J. Mater. Chem.,* 5:7, pp. 1007-1011 (1995); and "Luminescence Lifetime Temperature Sensing Based on Sol-Gels and Poly(acrylonitrile)s Dyed with Ruthenium Metal-Ligand Complexes," G. Liebsch, I. Klimant, and O.S. Wolfbeis, *Advanced Materials,* 11:15, (1999).

The embodiment of FIG. 10 integrates multiple spectral functionalities into a layered particle system. The particle contains an inner fluorescent core (shown red), covered with a photochromic (saturable/reverse saturable absorber) layer, covered with a second fluorescent layer (shown green). The core may have a substantially spherical shape, and the photochromic layer may be a shell which surrounds the core, and the fluorescent layer may be another shell which surrounds the first shell. Under typical ambient illumination, the particle could be relatively colorless, enabling it to be readily integrated onto a substrate with other reflective features. Upon exposure to UV radiation, both fluorescent layers would begin to absorb UV and emit their respective colors, creating in this case yellow. Upon exposure to UV, the photochromic layer will darken, blocking some of both the excitation light and the fluorescence from the core. A shift from yellow (mixed red and green fluorescence) to green would thereby be the gradual result of an applied region of such particles thus exposed to UV.

The embodiment of FIG. 11 integrates some or all of the dynamic color-changing functionality into a mixed particle system. The system contains two (or more) separate fundamental particles. One group of which imparts reflective or fluorescent functionality (red) to the mixture, and one that imparts photochromic functionality to the mixture. When viewed under ambient lighting conditions, the mixed particle system reflects the color spectrum of the reflective particles (red). When exposed to UV, any fluorescent particles in the mixture will begin to fluoresce, and the photochromic particles will begin to darken and reduce the light available to both reflect off of the reflective pigment particles and to excite the fluorescence. Thus, UV exposure causes the reflected and/or fluorescent color spectrum to diminish in brightness.

Saturable and reverse-saturable (s/rs) absorbers could also be integrated into the mixed particle system causing it to shift from a darker color to a reflected/fluorescent color as the transitions saturated and the s/rs absorbers became transparent.

The embodiment of FIG. 12 integrates some or all of the dynamic color-changing functionality into a mixed particle system. The system uses one or more fluorescent particles mixed, in an appropriate ratio, with photochromic (s/rs absorber) particles which are separate from the fluorescent particles. The photochromic changes to a color (shown blue) upon exposure to UV, creating a filter for some of the fluorescent emission lines. Under typical ambient illumination, this system could be close to colorless enabling it to be integrated into reflective features on a substrate without being highly noticeable.

Upon excitation with UV, the fluorescent particles will begin to emit light at their characteristic wavelengths. As the photochromics begin to change their absorption properties, typically with a slightly longer response time on the order of a few seconds, they will begin to block UV from the fluorescent particles somewhat, and to filter out some of the emitted fluorescence. This change in the absorption of the photochromic particles will thereby alter the spectral constituents of the light that is delivered to the observer from the fluorescers. In addition, the photochromic particles will contribute an altered reflectivity (shown blue) to the observed color spectrum delivered to the observer.

As with the other embodiments, it is possible to integrate non-visible emission lines into the light-emitting particles (fluorescers) to increase their utility as security pigments, as such invisible lines can generally only be detected with electronic means (photodetectors), and not the eye.

The embodiment of FIG. 13 integrates some or all of the dynamic color-changing functionality into a mixed particle system. The system integrates two or more pigments that fluoresce under UV but which have different time-constants for their emission, such as a fluorescent material (as one pigment) and a phosphorescent material (as another pigment). Under typical ambient lighting conditions, these particles can have little or no observable color rendering them appropriate for over laminates (or coatings) on reflective inks, coatings, and substrates. When exposed to UV, the particles begin to absorb light and subsequently re-emit the light in their respective wavelength bands. Upon cessation of the UV exposure, the fluorescent emission diminishes rapidly, on the order of nanoseconds, but the phosphorescent materials continue to emit for a while. Thus, a substrate that initially only reflected light, can be induced to emit a mixed color spectrum under direct UV excitation, followed by a different (possibly also mixed) spectrum after the UV has been removed.

As with previous embodiments described herein, multiple UV induced color-changing effects can be integrated onto a substrate in close proximity to provide not only enhanced features, but interesting ones as well. Patterning of multiple such features in, for instance, concentric circles, stripes, checks and squares, etc. can provide unique indicia which can be used to identify or authenticate the object which includes the indicia.

The embodiment of FIG. 14 uses multiple layers of material to achieve the desired effect. A first layer of fluorescent particles with time constant of emission $\tau_1$, is applied to a substrate, followed by a second layer of fluorescent material (e.g. a phosphorescent material) with time constant of emission $\tau_2$, not equal to $\tau_1$. Additional layers can be applied exceeding two. The pigments can be nearly invisible in ambient light enabling them to be applied to substrate with other pigments without detracting from them. When exposed to UV, all layers will begin to emit their characteristic emission spectra resulting in a mixed spectrum being presented to an observer. Upon cessation of the UV, the returned color spectrum will change as one by one the shorter emission time-constant materials cease to emit light. This embodiment provides for a system that changes from one to at least one other color as it is removed from UV illumination.

The embodiment of FIG. 15 integrates multiple spectral functionalities into a layered particle system to achieve a dynamic response to UV. It uses two or more fluorescent layers with time constants $\tau_1$ and $\tau_2$, where $\tau_1 \gg \tau_2$. Upon UV excitation, all of the fluorescent materials emit light of their characteristic wavelength bands returning a mixed spectrum to the observer. Upon cessation of UV, the shorter-lived $\tau_2$ (shown green) material fades, while the more phosphorescent $\tau_1$ material (shown red) continues to glow for some period. Thus the color of the substrate appears to shift from yellow (red+green) to red when the material is exposed to and then removed from the source of UV.

The embodiment of FIG. 16 uses an intensity dependent emission spectrum as the feature. A monolithic particle, that responds to focused UV light by emitting a first color spectrum, which changes as the intensity of the excitation is reduced (defocused) is the basis for this embodiment. The particle is integrated onto the substrate using an appropriate carrier. When exposed to focused UV light it emits a characteristic spectrum which includes transitions that require higher intensity to be induced. As the focus of the UV light is moved beyond the substrate surface, and the intensity is reduced, the color spectrum of the emission changes. The particles or layers used in the embodiments of FIG. 16 may be created by forming particles or layers which include two (or more) fluorescent chromophores, one of which has a much higher efficiency (in converting received UV into fluorescent emissions) than the other fluorescent chromophore. The higher efficiency fluorescent chromophore will fluoresce much more than the lower efficiency fluorescent chromophore and will shift the resulting output color spectrum toward the color of the higher efficiency fluorescent chromophore when the illumination intensity is low (e.g. a defocused UV light source) and when the illumination intensity is high, the lower efficiency fluorescent chromophore will contribute more of its color to the resulting output color spectrum.

In the foregoing specification, the inventions have been described with reference to specific exemplary embodiments thereof. It will be evident that various modifications may be made thereto without departing from the broader spirit and scope of the inventions as set forth in the following claims.

The specification and drawings are, accordingly, to be regarded in an illustrative sense rather than a restrictive sense.

What is claimed is:

1. An object comprising:
   a substrate; and
   an indicia comprising a plurality of first particles coupled to the substrate, each first particle including a shell covering a core, wherein the shell includes a first material, and wherein the core includes a second material,
   wherein the first material comprises a photochromic material having a first optical appearance without ultraviolet (UV) excitation and a second optical appearance after receiving UV excitation after a first response time,
   wherein the second material comprises a fluorescent chromophore which emits fluorescent radiation in response to UV illumination, wherein the second material is capable of providing a color after receiving UV excitation after a second response time, the second response time being less than the first response time, and wherein the indicia appears to radiate a first color upon initial UV excitation after the second response time and before the first response time while the first material has the first optical appearance and then appears to radiate a second color upon continued UV excitation after the first response time as the first material has changed to the second optical appearance, wherein the photochromic material, when having the second optical appearance, attenuates the fluorescent radiation from the fluorescent chromophore, and wherein the first color is based on the fluorescent radiation from the fluorescent chromophore.

2. The object as in claim 1, wherein the second color is based on reflections from the first material in the second optical appearance, and wherein the photochromic material changes from the first optical appearance to the second optical appearance, while under UV excitation, after the first response time, the first response time being in a range of more than one-third second to less than 20 seconds, and wherein the second response time is immediately upon receiving the UV excitation such that the first color is visible after the second response time and before the first response time for at least one-third second to as long as 20 seconds.

3. The object as in claim 1, wherein the indicia further comprises a third material, wherein the second color is based on fluorescent radiation from the third material, and wherein the photochromic material changes from the first optical appearance to the second optical appearance, while under UV excitation, after the first response time, the first response time being in a range of more than one-third second to less than 20 seconds, and wherein the second response time is immediately upon receiving the UV excitation such that the first color is visible between the second response time and the first response time for at least one-third second to as long as 20 seconds.

4. The object as in claim 1, wherein the object is currency, and wherein the shell surrounds the core.

5. The object as in claim 4 further comprising a plurality of second particles, each second particle including the second material.

6. The object as in claim 5, wherein the plurality of first particles and the plurality of second particles are disposed in a single layer on the substrate.

7. The object as in claim 6, wherein the single layer was formed from an ink printed on the substrate, and wherein the plurality of first particles and the plurality of second particles are mixed in the single layer.

8. The object as in claim 6, wherein each first particle further comprises a further shell covering the shell, and wherein the further shell comprises a second fluorescent chromophore.

9. The object as in claim 5, wherein the plurality of second particles are disposed in a first layer on the substrate and the plurality of first particles are disposed in a second layer layered over the first layer, and wherein the first and second layers form patterns on the substrate.

10. The object as in claim 4, wherein the first material surrounds the core.

11. The object as in claim 4, wherein the first material reversibly returns to the first optical appearance after the UV excitation is stopped.

12. The object as in claim 4, wherein the plurality of first particles are disposed in a single layer on the substrate, and wherein the single layer was formed from an ink.

13. A method to authenticate an object, the method comprising:
    exposing a material on the object to a set of wavelengths for a period time longer than a first response time and a second response time, the first response time longer than the second response time, wherein the material appears to radiate a first color upon initial exposure to the set of wavelengths after the second response time and before the first response time, and wherein the material appears to radiate a second color upon continued exposure to the set of wavelengths after the first response time, wherein the material comprises a plurality of particles, each particle including a shell covering a core, wherein the shell includes a first material comprising a photochromic material, and wherein the core includes a second material comprising a fluorescent chromophore which emits fluorescent radiation in response to UV illumination;
    observing radiation of the first color in response to the exposing after the second response time and before the first response time; and
    observing radiation of the second color in response to the exposing after the first response time and after the observing of radiation of the first color, wherein the observing radiation of the first color and the second color is used to determine an authenticity of the object.

14. The method as in claim 13, wherein the material has an initial color prior to the exposing, wherein the material appears to change from the initial color then to the first color and then to the second color in response to the exposing and, after the exposing is stopped, the material reversibly returns to the initial color, and wherein the time between changing from the first color after the second response time to the second color after the first response time is more than one-third second to less than 20 seconds, such that the first color is visible for at least one-third second to as long as 20 seconds.

15. The method as in claim 14, wherein the object is a currency.

16. The method as in claim 13, wherein exposing the material to the set of wavelengths causes a visible spectrum of the material to dynamically shift after the second response time and before the first response time from a first color spectrum having the first color to a second color spectrum having the second color.

* * * * *